March 18, 1924.  
F. J. JOHNSON  
DISK CULTIVATOR  
Filed Dec. 3, 1918

Witnesses  
Inventor  
Francis J. Johnson  
By Frederick Whyou  
Atty

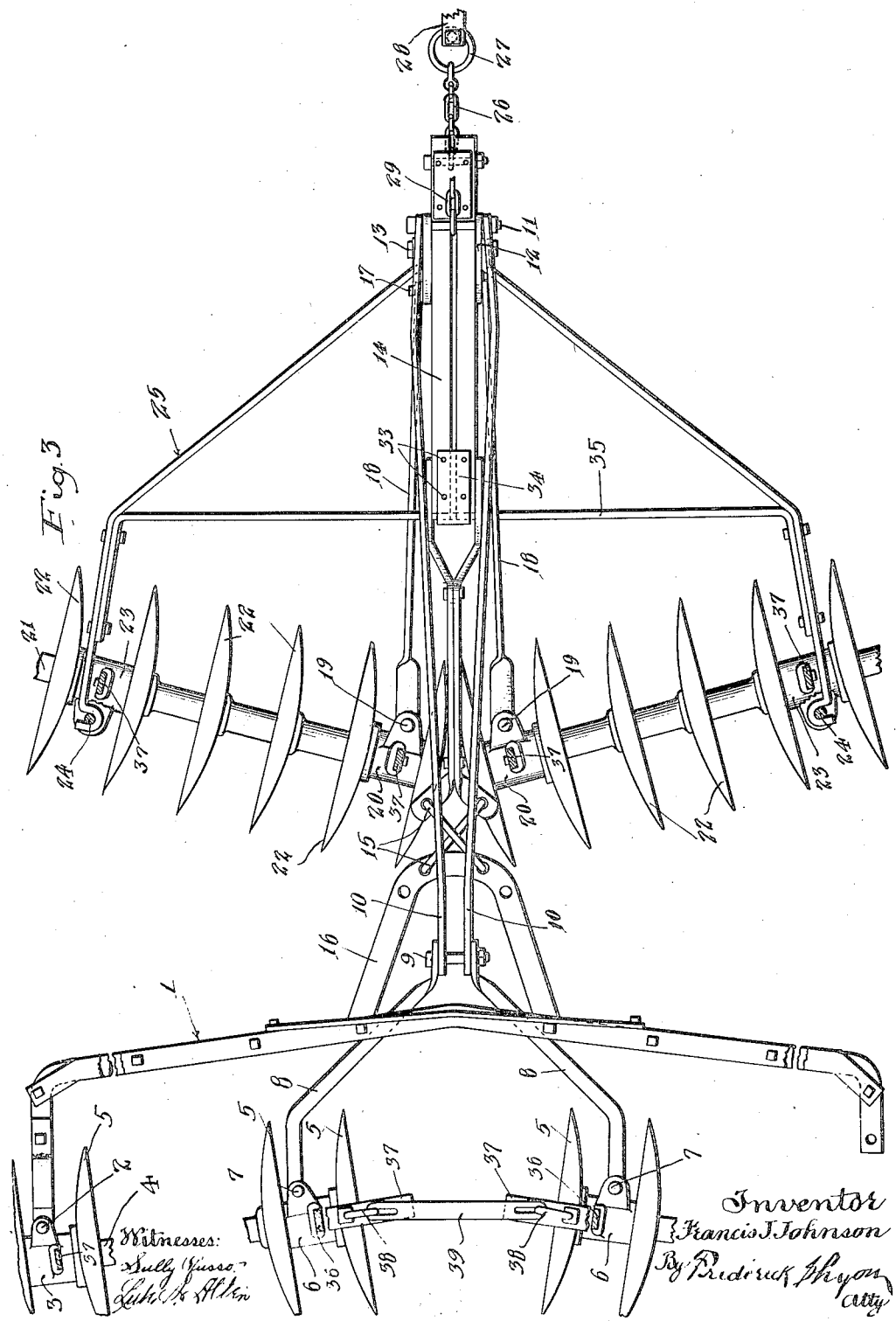

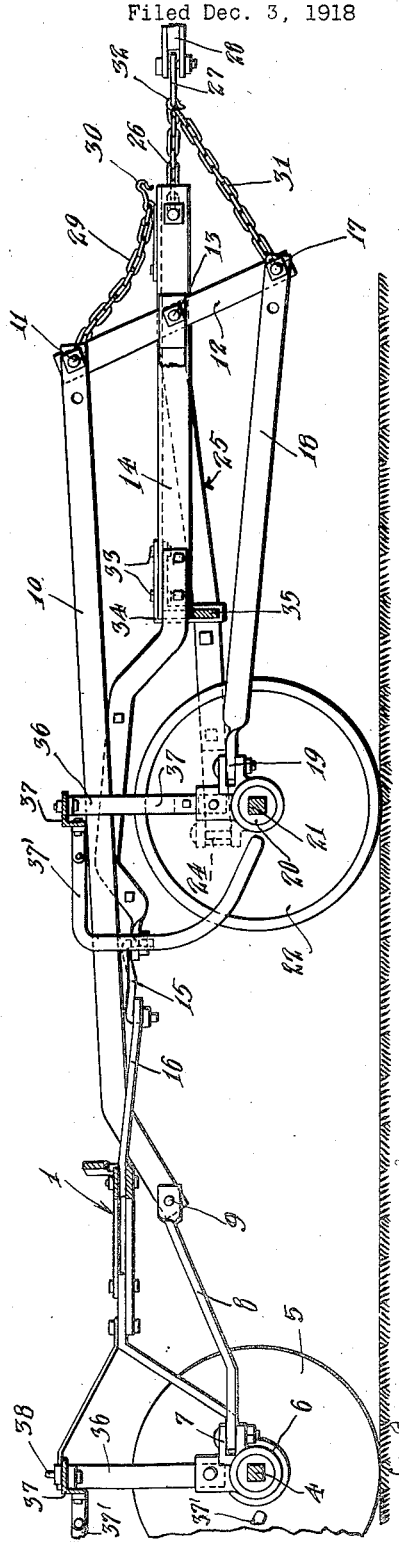

Patented Mar. 18, 1924.

1,487,388

UNITED STATES PATENT OFFICE.

FRANCIS J. JOHNSON, OF LOS ANGELES, CALIFORNIA; SUSIE M. JOHNSON, ADMINISTRATRIX OF SAID FRANCIS J. JOHNSON, DECEASED, ASSIGNOR, BY MESNE ASSIGNMENTS, TO MOLINE PLOW COMPANY, INCORPORATED, OF MOLINE, ILLINOIS, A CORPORATION OF VIRGINIA.

DISK CULTIVATOR.

Application filed December 3, 1918. Serial No. 265,089.

*To all whom it may concern:*

Be it known that I, FRANCIS J. JOHNSON, a citizen of the United States, residing at Los Angeles, in the county of Los Angeles and State of California, have invented a new and useful Disk Cultivator, of which the following is a specification.

This invention relates to that type of agricultural implement termed disk cultivator and pertains more particularly to the mechanism for changing the positions of the axles and their disks relative to one another and to the longitudinal axis of the implement.

An object of the invention is to effect the change of position of the disks by a construction that will utilize for this purpose the pull of the tractor or other motive power.

Another object is to produce a cultivator of this description which will be comparatively simple to construct and operate.

Other objects and advantages will appear from the subjoined detailed description.

The accompanying drawings illustrate the invention:

Fig. 3 is an enlarged fragmental plan view of the cultivator to more clearly show some of the parts thereof.

Fig. 4 is an enlarged fragmental side elevation partly in section on line indicated by $x^4$—$x^4$, Fig. 2.

Figure 1:
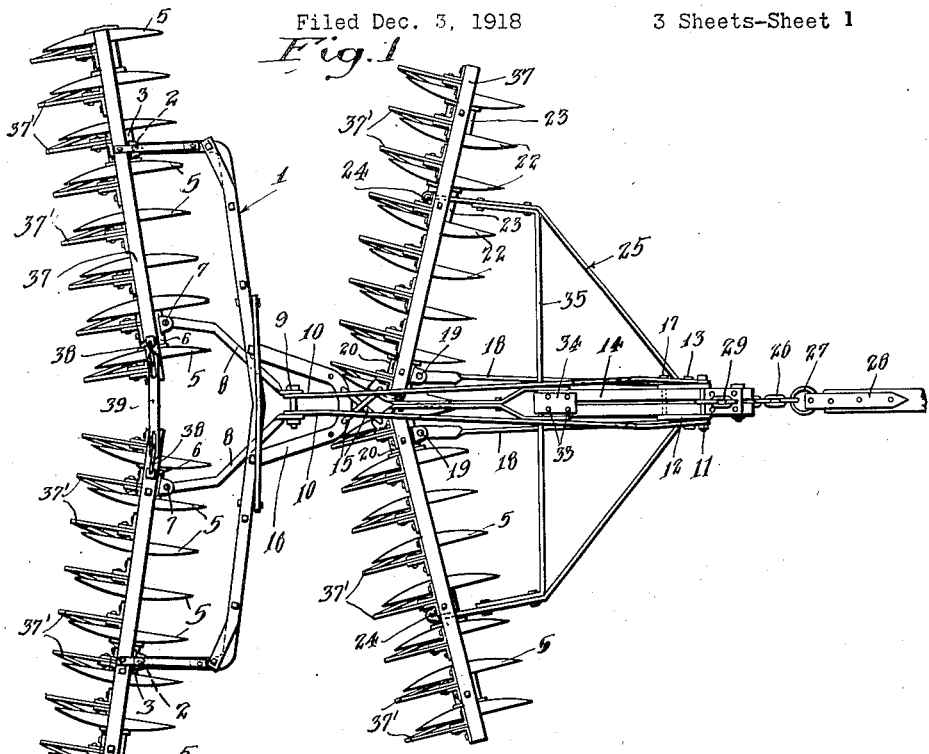
Figure 1 is a plan view of a cultivator built in accordance with the provisions of this invention, the various parts of the cultivator being shown in the cultivating positions.

There is provided a rear frame 1 of any suitable construction and in the drawings said frame is U-shaped in plan view. The frame is pivoted at 2 at its opposite ends to bearings 3 in which are respectively journaled axles 4 carrying cultivator members that may be in the form of disks 5. The axles 4 at their inner ends are journaled in bearings 6 which are pivoted at 7 to angular links 8 pivotally connected in turn at 9 to a shifting rod 10 that, in the instance shown, comprises two members, though but one member may be employed if desired. The shifting rod 10 is pivoted at its forward end at 11 to a lever 12 which is fulcrumed at 13 substantially midway of its ends to a hitch bar 14 that may be of any suitable construction. The hitch bar 14 is pivotally connected at its rear end by a pair of links 15 to a U-shaped yoke 16 forming a forwardly extending portion of the rear frame 1.

The lever 12 is pivoted at its lower end at 17 to a shifting rod 18 which in the instance shown in the drawings comprises two members and which in turn is pivoted at 19 to bearings 20 that journal the inner ends of axles 21 respectively carrying cultivator members in the form of disks 22. The axles 21 are also journaled near their outer ends in bearings 23 which are pivoted at 24 to a front frame 25 that may be of any suitable construction. In the drawings the frame 25 is more or less V-shaped. The front and rear axles are arranged in pairs respectively.

From the foregoing it is seen that the rear axles 4 are fulcrumed near their outer ends on the rear frame 1 and that the front axles 21 are fulcrumed near their outer ends on the front frame 25 and that swinging of the lever 12 around its fulcrum 13 will cause forward movement of the inner ends of the front axles and rearward movement of the inner ends of the rear axles, or rearward movement of the inner ends of the front axles and forward movement of the inner ends of the rear axles according to whether the upper end of the lever 12 is swung rearward or forward.

To the forward end of the hitch bar 14 is fastened a connection which may be in the form of a chain 26 adapted to be connected by a ring 27 to a draw bar 28 or other suitable power applying device of a tractor or the like, not shown. To the pivot 11 is fastened a connection which may be in the form of a chain 29 provided with a hook 30 adapted to be hooked onto the ring 27 when it is desired to shift the rod 10 into its forward position and the rod 18 into its rearward position. To the pivot 17 is fastened a connection which may be in the form of a chain 31 having a hook 32 adapted to be hooked onto the ring 27 when it is desired to shift the rod 10 into its rearward position and the rod 18 into its forward position, as in Fig. 4.

The hitch bar 14 is fastened by bolts 33 and a strap 34 to the cross bar 35 of the frame 25, said hitch bar resting on the cross bar.

On the frames 1, 25 are mounted standards 36 on which rest and are fastened scraper supports 37 carrying scrapers 37' in the form of fingers extending rearwardly, then downwardly, then forwardly between adjacent disks so as to remove matter that may tend to clog the interdisk spaces. The rear scraper supports are loosely and pivotally connected together by suitable means and in this instance these means comprise fixed links 38 fastened to the inner ends of the rear scraper supports 37 respectively and a floating link 39 engaging the fixed links.

In practice, the invention operates as follows: Assuming that the parts are in the positions shown in Fig. 2 of the drawings, these positions being those desired when the implement is to be drawn along a road or other surface which it is not desired to cultivate, if it be desired to change the implement so that the parts correspond in positions to those shown in Fig. 1, the motive power will be backed up and the hook 32 will be released from the ring 27 and the hook 30 will be attached to said ring. Then the motive power will be driven ahead thus pulling on the chain 29 to cause the rods 10 and 18 to move forward and rearward respectively, thus bringing the disks into the angular relation shown in Fig. 1.

Figure 2:
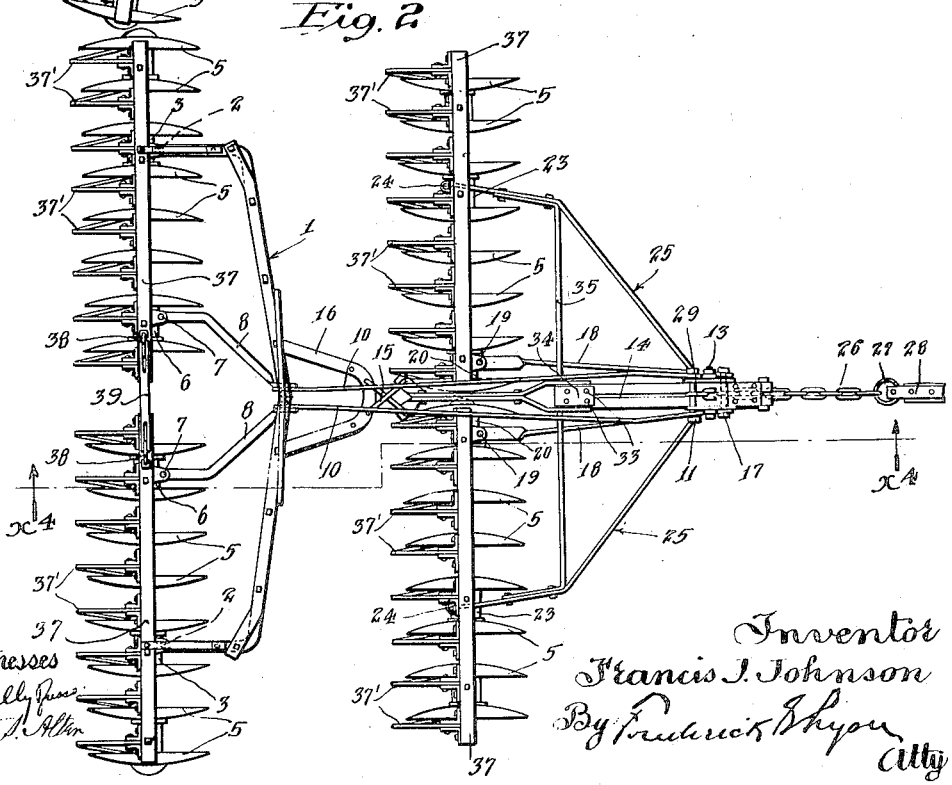
Fig. 2 is a plan view of the cultivator with the parts disposed in the positions they occupy when it is not desired to cultivate the land.

If now it be desired to change the parts back to the positions shown in Fig. 2, the motive power will be backed up and the hook 30 will be released from the ring 27 and the hook 32 will be fastened to said ring. Then the motive power will be driven forward so as to cause the chain 31 to pull the lower end of the lever 12 forward and consequently move the rod 10 rearward and the rod 18 forward, whereupon the cultivator disks will assume the non-cultivating positions as in Fig. 2.

It is understood that the invention is not limited in its broader phases to the exact details of construction described above and shown in the drawings, but that it also includes such changes and modifications of the elements in the various combinations as lie within the spirit and scope of the appended claims.

I claim:

1. A tandem disk harrow adapted to be drawn by a draft device such as a tractor or the like, having a front pair of gangs, a rear pair of gangs, draft connections between the pairs of gangs, and means independent of the draft connections between the gangs for utilizing the draft power to positively shift the inner ends of the gangs of one pair and the inner ends of the gangs of the other pair relatively in opposite directions both into and out of working position.

2. A tandem disk harrow adapted to be drawn by a draft device such as a tractor or the like, having a front pair of gangs, a rear pair of gangs, draft connections between the pairs of gangs, and means independent of the draft connections between the gangs serving to utilize the draft power to positively and simultaneously shift the inner ends of the front pair of gangs rearwardly and the inner ends of the rear pair of gangs forwardly and vice versa.

3. A tandem disk harrow having a front pair of gangs, a rear pair of gangs, draft mechanism for the gangs including portions connected independently to the inner ends of each pair of gangs for angling the gangs into and out of working position, and means for selectively changing the point of application of the draft of a draft device to said draft mechanism to move it in different directions to positively angle the gangs both into and out of working position.

4. A tandem disk harrow comprising a front pair of gangs, a rear pair of gangs, a draft device including portions connected directly to the inner ends of each pair of gangs independently, and means for shifting the point of application of the draft to the draft device so that a pull on said draft device will positively move the inner ends of the front pair of gangs rearwardly, and the inner ends of the rear pair of gangs forwardly when the draft is applied at one point, and so that the inner ends of the front pair of gangs will be shifted forwardly, and the inner ends of the rear pair of gangs rearwardly when the draft is applied at another point.

5. A tandem disk harrow comprising a front pair of gangs, a rear pair of gangs, a lever pivoted near its center, connections between one end of the lever and the inner ends of the rear pair of gangs, connections between the other end of the lever and the inner ends of the front pair of gangs, and means for selectively changing the point of application of the draft to make it effective on either end of the lever.

6. A tandem disk harrow having a front pair of gangs, a rear pair of gangs, draft connections for the gangs, a lever pivoted near the forward end of the draft connections, connections between one end of the lever and the inner ends of one pair of gangs, connections between the opposite end of the lever and the inner ends of the other pair of gangs, and means for selectively changing the point of application of the draft from one end of the lever to the other.

7. A disk cultivator comprising front and rear frames, a pair of axles fulcrumed near their outer ends on the frames respectively, cultivator members on the axles, a hitch bar connected with the front and rear frames, a lever pivoted to the hitch bar, a rod connected at one end to one end of the lever and at its other end to the inner ends of the rear axles, a second rod connected at one end to the other end of the lever and at its other end to the inner ends of the front axles, draft means connected with the hitch bar, and means adapted to be selectively engaged with the draft means to effect a pull on either end of the lever.

8. A disk cultivator comprising a frame, axles fulcrumed on the frame near their outer ends, cultivator members on the axles, a hitch bar connected with the frame, a shifting bar pivotally connected to the inner ends of the axles, a lever pivoted to the hitch bar and to the shifting bar, a ring connected with the hitch bar, connections fastened to the ends respectively of the lever, hooks on the connections respectively adapted to be selectively engaged with the ring, and means to apply a pull on the ring.

9. A disk cultivator comprising front and rear frames, axles fulcrumed on the frames near their outer ends, cultivator members on the axles, a hitch bar connected with both frames, a shifting bar pivotally connected at one end with the inner ends of the front axles and at its other end with one end of the lever, a second shifting bar pivotally connected at one end with the inner ends of the rear axles and at its other end with the other end of the lever, a ring connected with the hitch bar, connections fastened to the ends respectively of the lever, hooks on the connections respectively adapted to be selectively engaged with the ring, and means to apply a pull on the ring.

Signed at Los Angeles, California, this 27th day of November, 1918.

FRANCIS J. JOHNSON.

Witnesses:
GEORGE H. HILES,
L. BELLE WEAVER.